H. D. CHURCH.
LOCK NUT.
APPLICATION FILED MAY 31, 1912.

1,077,670.

Patented Nov. 4, 1913.

WITNESSES
Chas. J. Fitzsimons.
Karl V. Goofrey

INVENTOR
Harold D. Church
By Millon Sibbetts
Attorney

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

LOCK-NUT.

1,077,670.   Specification of Letters Patent.   Patented Nov. 4, 1913.

Application filed May 31, 1912. Serial No. 700,723.

*To all whom it may concern:*

Be it known that I, HAROLD D. CHURCH, a citizen of the United States, and resident of Detroit, Wayne county, State of Michigan, have invented certain new and useful Improvements in Lock-Nuts, of which the following is a specification.

This invention relates to lock-nuts. Its principal object is the production of a nut or similar screw threaded device that may be securely locked to the bolt or other threaded piece upon which the nut is mounted. In the present invention this object is attained by locking the nut to the shaft or bolt both positively and frictionally and in such way that the nut may be locked and unlocked and adjusted on the shaft without in any way distorting the threads of either the nut or shaft.

Figure 1:
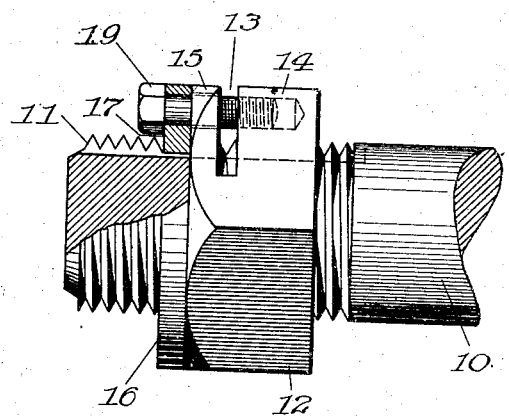
Figure 2:
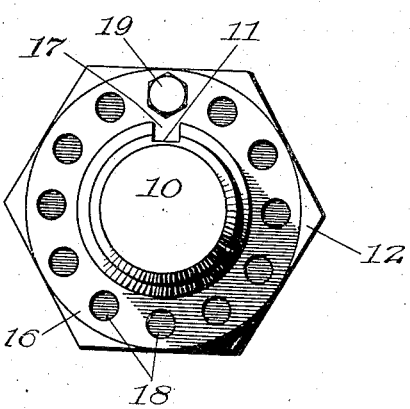
Figure 3:
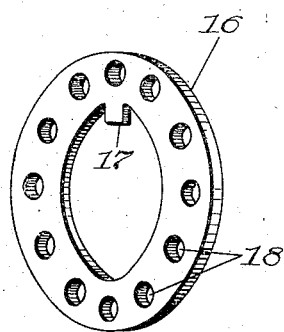

Other objects of the invention will appear from the following detail description taken in connection with the drawings, in which, Figure 1 is an elevation and part sectional view of a lock nut and shaft made in accordance with this invention; Fig. 2 is an end view of the device shown in Fig. 1; and Fig. 3 is a perspective view of the washer.

In the drawings 10 represents a shaft or bolt or other threaded piece and in the embodiment of the invention shown it is formed with a groove or keyway 11. A nut 12 is adapted to be adjusted lengthwise of the shaft 10 and it is cut part way through or split transversely as at 13 so that the separated parts 14 and 15 of the nut may be drawn together or separated to thereby bind the nut securely to the threads of the shaft 10. When these parts 14 and 15 of the nut 12 are drawn together they tend to ride on the adjacent parts of the threads on the shaft 10 thereby drawing the opposite side of the nut into close frictional contact with the threads of the shaft 10 which gives the secure binding effect just referred to.

While a nut may be very securely locked in the manner just described it has been found that in some cases this is not sufficient protection against movement of the nut on the shaft, and particularly is this true in the use of such nuts on motor vehicles of the commercial type where excessive vibration is present. The present invention therefore is designed to provide an additional locking means for the nut without materially increasing the number of parts employed and the expense of producing the nut. This additional locking means which is adapted to positively lock or key the nut to the shaft while it at the same time frictionally secures the nut thereon, may be of any suitable form or construction and may have any suitable means for securing it to the nut and to the shaft. As shown, it comprises a locking piece 16 in the form of a ring having a key or tongue which enters the groove or keyway 11 in the shaft and thereby prevents the piece 16 turning on the shaft. A binding bolt 19 is adapted to pass through any one of a series of holes 18 in the locking pin and through the part 15 and into the part 14 of the nut, having a threaded engagement with one of said parts, preferably part 14, as shown in Fig. 1. Thus the entire lock nut is composed of but three pieces, the nut 12, the locking pin 16, and the binding bolt 19, and it will be understood that the binding bolt 19 may be tightened in the part 14 of the nut thereby bringing the parts 14, 15, closer together and binding the nut on the threads of the shaft 10. Of course this bolt 19 also secures the locking piece to the nut and by reason of the locking piece being keyed to the shaft 10 the nut is prevented from turning thereon.

It will be further understood that a very fine adjustment of the nut on the shaft may be obtained by arranging the holes 18 rather close together, the spacing of these holes depending upon the fineness of adjustment required.

Having thus described my invention what I claim is:

1. A lock nut comprising a nut proper split transversely and a device having a locking key or tongue, and means for securing it to the nut and coöperating with the split portion of the nut to bind the threads of the latter.

2. A lock nut comprising a nut proper split transversely and a device having a locking key or tongue and having a bolt extending into the nut through said split for securing said device to the nut and for coöperating with the split portion of the nut to bind the threads of the latter.

3. A combination lock nut and washer comprising a nut proper split transversely, a locking piece having a key or tongue, and means adapted to secure the locking piece to the nut and bind the threads of the latter.

4. The combination with a shaft or other threaded piece formed with a longitudinal keyway, of a nut cut part way through transversely of its axis and adapted to be adjusted on said shaft, a locking piece provided with a key adapted to said keyway, and a binding bolt adapted to secure said locking piece to said nut and bind the latter to the shaft.

5. The combination with a shaft or other threaded piece formed with a longitudinal keyway, of a nut on said piece split transversely of its axis, a locking piece formed with a key adapted to said keyway and with a series of holes, and a binding bolt adapted to pass through any one of said holes, into said nut, and across said split to secure the locking piece to the nut and simultaneously bind the nut to the said shaft by contracting or expanding the parts of the nut separated by said split.

6. The combination with a threaded shaft or bolt, of a nut adapted to be adjusted on the shaft lengthwise thereof, and a device positively prevented from turning on the shaft and connected to the nut to thereby lock the nut against turning on the shaft, and provided with means coöperating with the nut to bind the nut on the shaft in any of its various positions of adjustment.

In testimony whereof I affix my signature in the presence of two witnesses.

HAROLD D. CHURCH.

Witnesses:
M. GILDEMEISTER,
R. E. SHIVERS.

---

Copies of this patent may be obtained for five cents each, by addressing the "Commissioner of Patents, Washington, D. C."